United States Patent [19]
Nishitani et al.

[11] Patent Number: 5,883,777
[45] Date of Patent: Mar. 16, 1999

[54] METER MODULE AND STRUCTURE FOR ASSEMBLING THE SAME

[75] Inventors: Keizo Nishitani; Minoru Kubota, both of Shizuoka, Japan

[73] Assignee: Yazaki Corporation, Tokyo, Japan

[21] Appl. No.: 779,954

[22] Filed: Dec. 23, 1996

[30] Foreign Application Priority Data

Dec. 25, 1995 [JP] Japan .................................... 7-336868

[51] Int. Cl.⁶ .................................................... H02B 1/10
[52] U.S. Cl. .......................... 361/647; 296/70; 307/10.1; 361/631
[58] Field of Search .................................... 307/9.1, 10.1, 307/112, 113; 439/34, 248, 620, 621; 361/622–631, 641–647, 648, 659, 660, 664, 668, 735, 736, 752, 784, 785, 826; 340/461; 248/27.1, 27.3; 296/70

[56] References Cited

U.S. PATENT DOCUMENTS

| | | | |
|---|---|---|---|
| 5,502,615 | 3/1996 | Kubota | 361/647 |
| 5,675,316 | 10/1997 | Nishitani | 340/461 |
| 5,676,552 | 10/1997 | Fukuda | 439/34 |

FOREIGN PATENT DOCUMENTS 7-96774   4/1995   Japan .

Primary Examiner—Gerald Tolin
Attorney, Agent, or Firm—Armstrong, Westerman, Hattori, McLeland, & Naughton

[57] ABSTRACT

The present invention relates to a meter module to be installed in an instrument panel of a car and a structure for assembling the meter module and to provide a meter module wherein the designs of the meters and switches can easily be modified and the functions thereof can be changed in accordance with a model and grade of the motor vehicle for installing them in the instrument panel in an easier and preferable manner. The meter module consists of an independent meter display unit and cluster unit having a guide protrusion respectively, both guide protrusions can be inserted into the same introducing guides of a module accommodation portion. The meter display unit includes meters and electric circuits thereof and cluster unit includes control switches and control circuits for the meters and the like and the electrical connection between the meter module and the wire harness installed in the motor vehicle can be performed simultaneously with the insertion of the meter module into the module accommodation portion of the instrument panel of the motor vehicle.

5 Claims, 6 Drawing Sheets

METER MODULE AND STRUCTURE FOR ASSEMBLING THE SAME

BACKGROUND OF THE INVENTION

1. Field of the Invention

The present invention relates to a meter module, in which meters, control circuits and the like are assembled for mounting them in an instrument panel of a car, and a structure for assembling the meter module in a car body. The meter module is defined as an electric accessory unit which is acquired by integrally coupling switches and meters with electronic components for their control and with a flexible printed circuit board.

2. Description of the Prior Art

To set up an electric circuit for an instrument panel of a car, there has been employed means for the manual installation of a wire harness, which is prepared based on a necessary electric circuit, in the body of the car or in the instrument panel of an dashboard of the car, and for connecting connectors of the wire harness with switches and connectors of meters.

In consonance with the development of electronics and enhanced electric car controls, a number of switches and meters to be provided in the instrument panel in front of drivers seats in the car has been increased, and electric circuits have become more complicated. Wire harnesses to be employed in the car to form such electric circuits have grown so large and heavy that they can not easily be retained in limited spaces, and the work involved in their assembly tends to be complex and inefficient.

In order to simplify the electric circuits in the instrument panels, a meter module M shown in FIG. 7, for example, has been proposed in Japanese Patent Application Laid Open No. Hei 7-96774. The meter module M comprises a cluster module d and a finish panel e to be attached to the front face of the cluster module d. The cluster module d is constituted by collectively and integrally coupling together an instrument board a provided with meters, indicator lamps and their drivers, an electric connection box b containing a power source for vehicle-mounted electric accessories including the meters, indicator lamps and the like and a functional circuit for distributing input/output signals to the vehicle-mounted electric accessories and controlling the components therein, and a switch unit c containing switches for the electric accessories.

As seen in FIG. 8, the meter module M is mounted at a prearranged portion of an instrument panel f and is electrically connected to an installed wire harness g by coupling a connector h of the wire harness g with a connector i of the meter module M.

In such meter module M, however, it has been required to change the structures of the cluster module d and finish panel e in order to modify designs of the meters and the switches and to change the functions thereof in accordance with the grade of a car. Accordingly, there has been a problem such that it is required to prepare many different modules for every type of car, and this in turn has resulted in the increase of the load of manufacturing and storing these modules. Further, when accessories are mounted around the periphery and on the reverse side of the meter modules, it is difficult to employ this method for a multi-functional dashboard because of a limited space to store.

SUMMARY OF THE INVENTION

It is therefore an object of the present invention To eliminate the above problems and to provide a meter module wherein the change of designs of meters and switches and the change of functions associated with the grade of a motor vehicle can be made easily, and to provide a structure for assembling the meter module being excellent in a procedure for assembling it on the motor vehicle.

To achieve the above object, according to a first aspect of the present invention,there is provided a meter module comprising switches, meters and an electric circuit for these switches and meters, wherein the meter module is formed separately into a display unit for meters and a cluster unit having an electric circuit for controlling switches and meters, and the meter display unit and the cluster unit are formed in such a manner as to be mounted independently on a module accommodating portion formed in a body of motor vehicle.

According to a second aspect of the present invention, a structure for assembling a meter module is provided by forming guide protrusions respectively on the meter display unit and the cluster unit of the meter module which is cited in the first aspect, wherein introducing guides are provided at the module accommodating portion of the car body to receive the guide protrusions, and the guide protrusions are inserted into the introducing guides to fix the meter display unit and the cluster unit in the module accommodating portion.

According to a third aspect, it is preferable that electric contacts connected to circuit conductors be provided for the guide protrusions of the meter display unit and the cluster unit, the circuit conductors having electric. contactors be provided at the introducing guides of the module accommodating portion, the meter display unit and the cluster unit be fixed to the module accommodating portion, and the electric contacts and the electric contactors are simultaneously brought into conduction with each other to connect mutual electric circuits.

According to a fourth aspect, it is preferable that both of the guide protrusions on the meter display unit and the cluster unit be inserted into the same introducing guides of the module accommodating portion of the instrument panel of the motor vehicle.

DETAILED DESCRIPTION OF THE PREFERRED EMBODIMENT

One embodiment of the present invention will now be explained.

Figure 1:
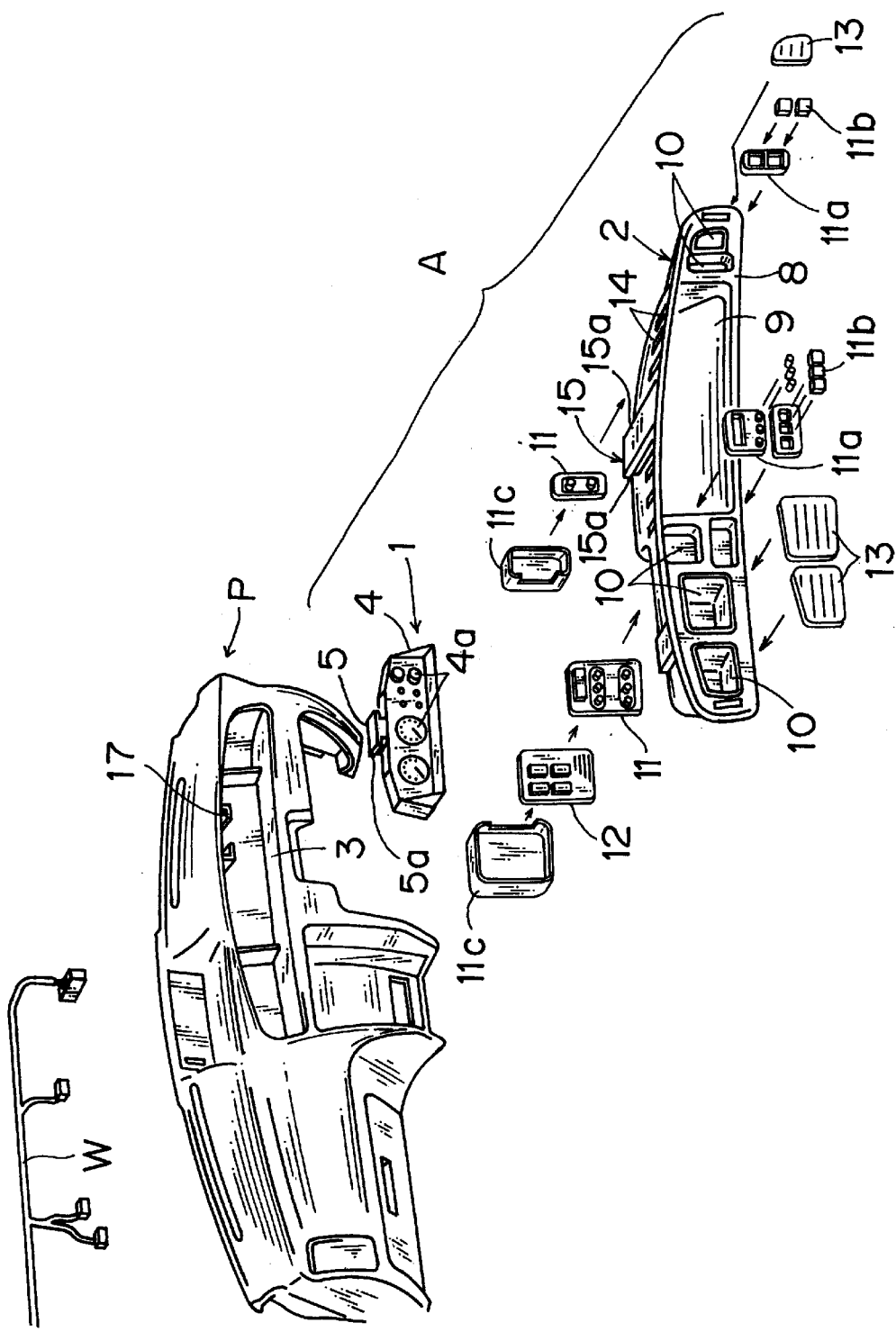
FIG. 1 is an exploded perspective view of a meter module and an instrument panel according to an embodiment of the present invention.

FIG. 1 is an exploded perspective view of a meter module A and an instrument panel P according to the embodiment of the present invention.

The meter module A consists of a meter display unit 1 and a cluster unit 2, and is contained in a module accommodating portion 3 formed in the instrument panel P.

The meter display unit 1 is an instrument board, in which meters 4a, such as a speedometer, a tachometer and various indicators, and electric wiring for them are installed in a frame like meter case 4 which is composed of a molded synthetic resin. A guide protrusion 5 having projecting strips 5a is formed on the meter case 4 at the top on both sides thereof.

Figure 2:
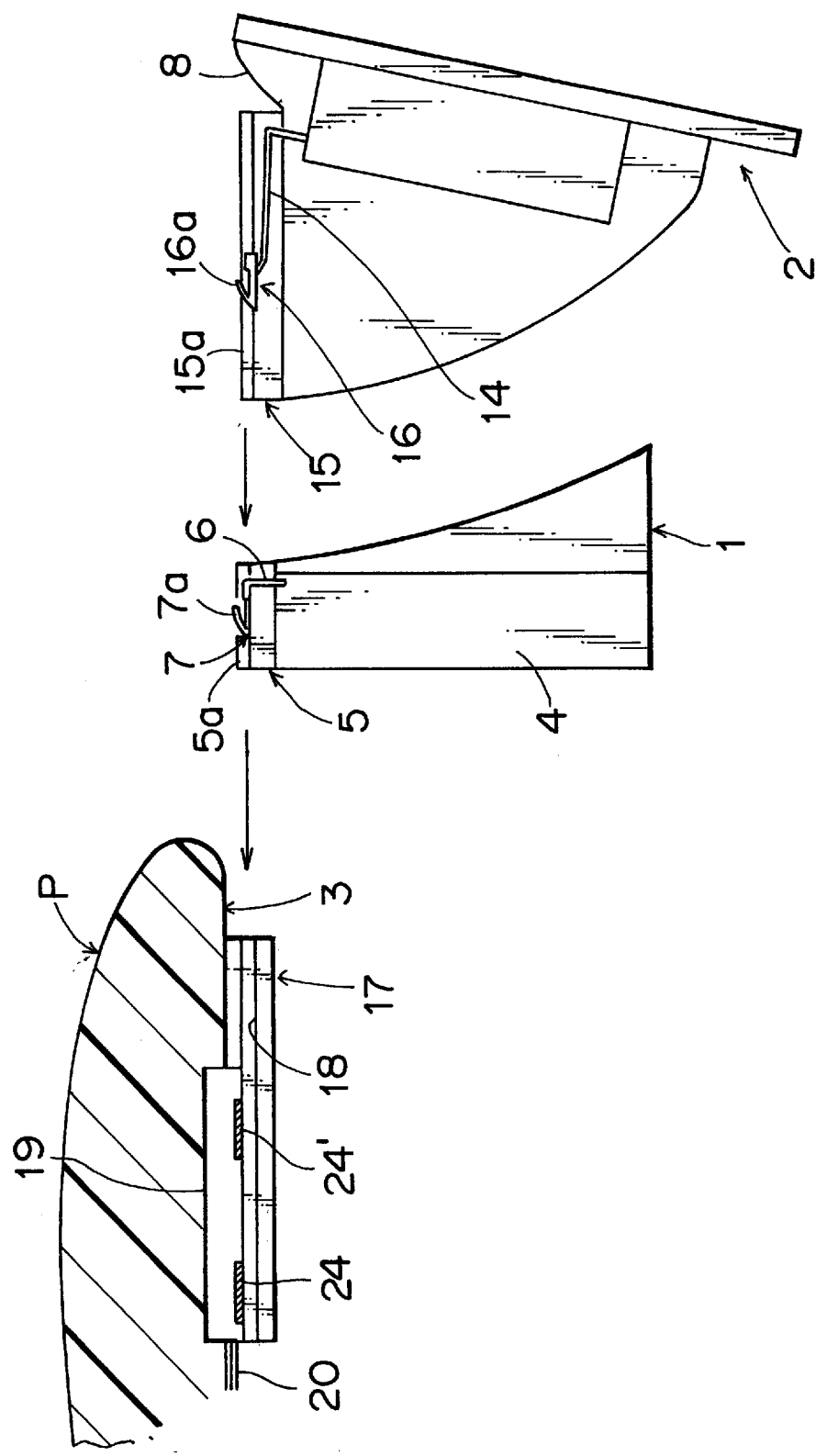
FIG. 2 is a diagram for explaining the process for attaching a meter display unit and a cluster unit of FIG. 1 to a module accommodating portion of the instrument panel.

As seen in FIG. 2, circuit conductors 6, which are to be connected to the circuit of the above meters, are provided for the guide protrusion 5, and the terminals of the circuit conductors 6 are connected to electric contacts 7 of face contact type having elastic contact pieces 7a.

The cluster unit 2 is so designed that operating devices, such as the various switches, are retained in an arc-shaped frame 8, which is of a molded synthetic resin so that it fits into the module accommodating portion 3 of the instrument panel P. An instrument board accommodating portion 9, in which the meter display unit 1 is retained, is formed substantially at the central part of the frame 8, and a plurality of installation windows 10 are formed on both sides of the instrument board accommodating portion 9.

Many types of switch assembly boards 11, a multiplex control board 12 and adjustable air conditioning vents 13 are installed in the installation windows 10. The switch assembly boards 11 and the multiplex control board 12 are installed in the installation windows 10 in such a manner that the switch boards 11a and switch key tops 11b are mounted from the front side and that rear cases 11c from the rear side.

Figure 3:
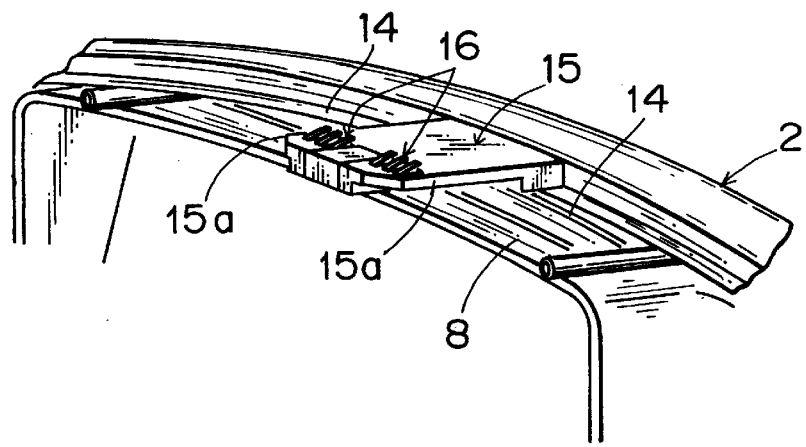
FIG. 3 is a perspective view of a guide protrusion provided on the cluster unit of FIG. 2.

As seen in FIG. 3, circuit conductors 14 for the electric wiring to be connected with the switch assembly boards 11 and the multiplex control board 12 are arranged on top of the frame 8, and a guide protrusion 15 having projecting strips 15a at the both sides is formed substantially at the central part of the frame 8. Electric contacts 16 of face contact type having elastic contact pieces 16a are connected to the terminal portions of the circuit conductors 14.

The module accommodating portion 3 of the instrument panel P is formed into an arc-shaped space for receiving the cluster unit 2 therein. Introducing guides 17 are formed at the upper portion of the module accommodating portion 3 to receive the guide protrusion 5 of the meter display unit 1 and the guide protrusion 15 of the cluster unit 2.

The introducing guides 17 are provided so as to face each other with an interval appropriate for receiving the projecting strips 15a of the guide protrusion 15 of the cluster unit 2, and grooves 18 are formed at the inside of the introducing guides 17. As the projecting strips 5a of the guide protrusion 5 of the meter display unit 1 and the projecting strips 15a of the guide protrusion 15 of the cluster unit 2 are inserted along the grooves 18, the meter display unit 1 and the cluster unit 2 are contained and fitted into the module accommodating portion 3 of the instrument panel P.

Figure 4:
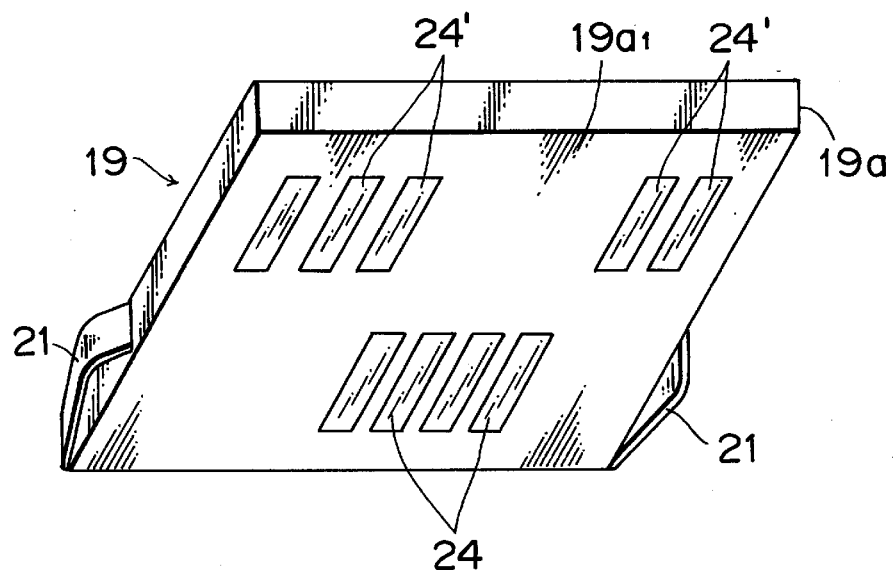
FIG. 4 is a perspective view of a connector for introducing guides of the module accommodating portion of FIG. 2.
Figure 5:
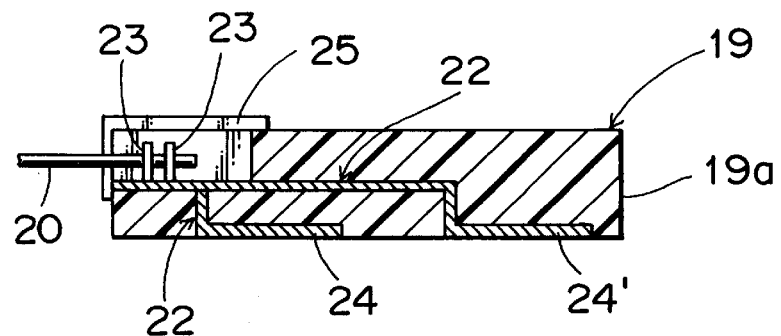
FIG. 5 is a cross-sectional view of the connector of FIG. 4.

A connector 19 being provided with electric contactors 24 and 24', shown in FIGS. 4 and 5, is provided for the introducing guides 17, and it is connected to a wire harness W, which is wired to the instrument panel P, by means of electric wires 20.

The connector 19 is formed into a flat shape and has elastic engagement pieces 21 at the both sides of a connector case 19a and includes, at an internal part, a plurality of bus bars 22 which are embedded into the connector case 19a by insertion molding.

At one end of the bus bar 22, pressure contact terminals 23 for inserting an electric wires with pressure are formed for connecting with the electric wires 20. A plurality of oblong electric contactors 24 and 24' are formed at the other ends of the bus bars 22 and are exposed on a lower face $19a_1$ of the connector case 19a. One set of the oblong electric contactors 24 is connected with the electric contacts 7 of the meter display unit 1, while the other set of the oblong electric contactors 24' is connected to the electric contacts 16 of the cluster unit 2. A cover 25 protects the pressure contact terminals 23.

The procedure for assembling the meter module A in the instrument panel P will now be described.

First, the meters 4a are mounted on the meter case 4 of the meter display unit 1, and the electric circuit for them is connected to the circuit conductor 6, thus providing the meter display unit 1 to which the meters 4a are mounted. For the cluster unit 2, the switch assembly boards 11 and the multiplex control board 12 are installed in the installation windows 10 of the cluster unit 2, the switch boards 11a and the switch key tops 11b are installed from the front side and that the rear cases 11c are from the rear side of the windows 10, and the adjustable air conditioning vents 13 are attached to the cluster unit 2. The electric circuits for these components are then connected to the circuit conductors 14.

Following this, when the projecting strips 5a of the guide protrusion 5 on the meter display unit 1 are inserted along the grooves 18 of the module accommodating portion 3 of the instrument panel P, and when the meter display unit 1 is pushed into a predetermined position, the oblong electric contactors 24 of the connector 19 are contacted with the elastic contact piece 7a of the electric contacts 7 of the meter display unit 1 for providing the electrical connection.

Then, when the projecting strips 15a of the guide protrusion 15 on the cluster unit 2 are inserted along the grooves of the module accommodating portion 3, and when the cluster unit 2 is pushed into a predetermined position so as to overlap the meter display unit 1, the oblong electric contactors 24' of the connector 19 are also contacted with the elastic contact pieces 16a of the electric contacts 16 of the cluster unit 2 for providing the electrical connection therebetween.

Figure 6:
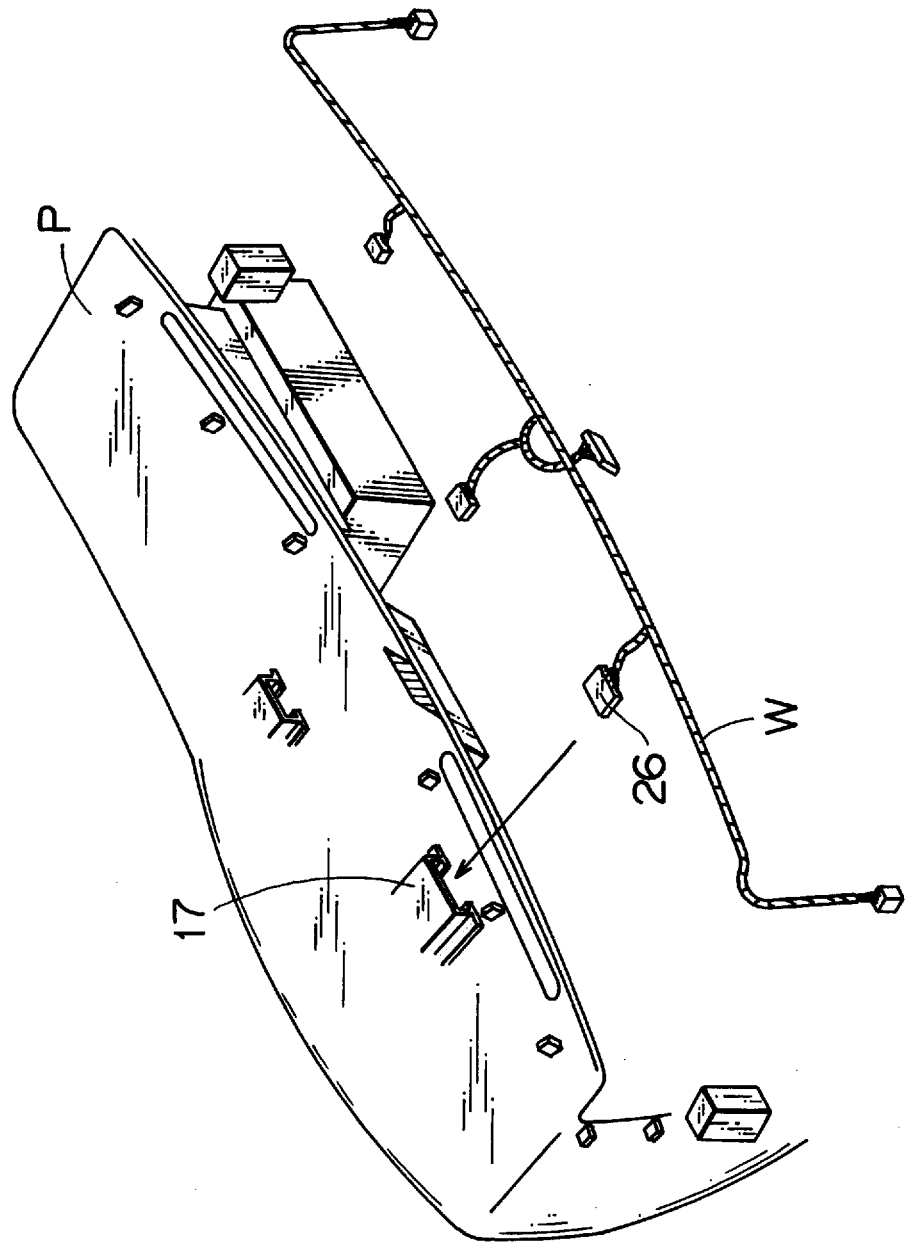
FIG. 6 is a diagram for explaining the connection of the meter module of FIG. 1 to a wire harness provided in the instrument panel.
Figure 7:
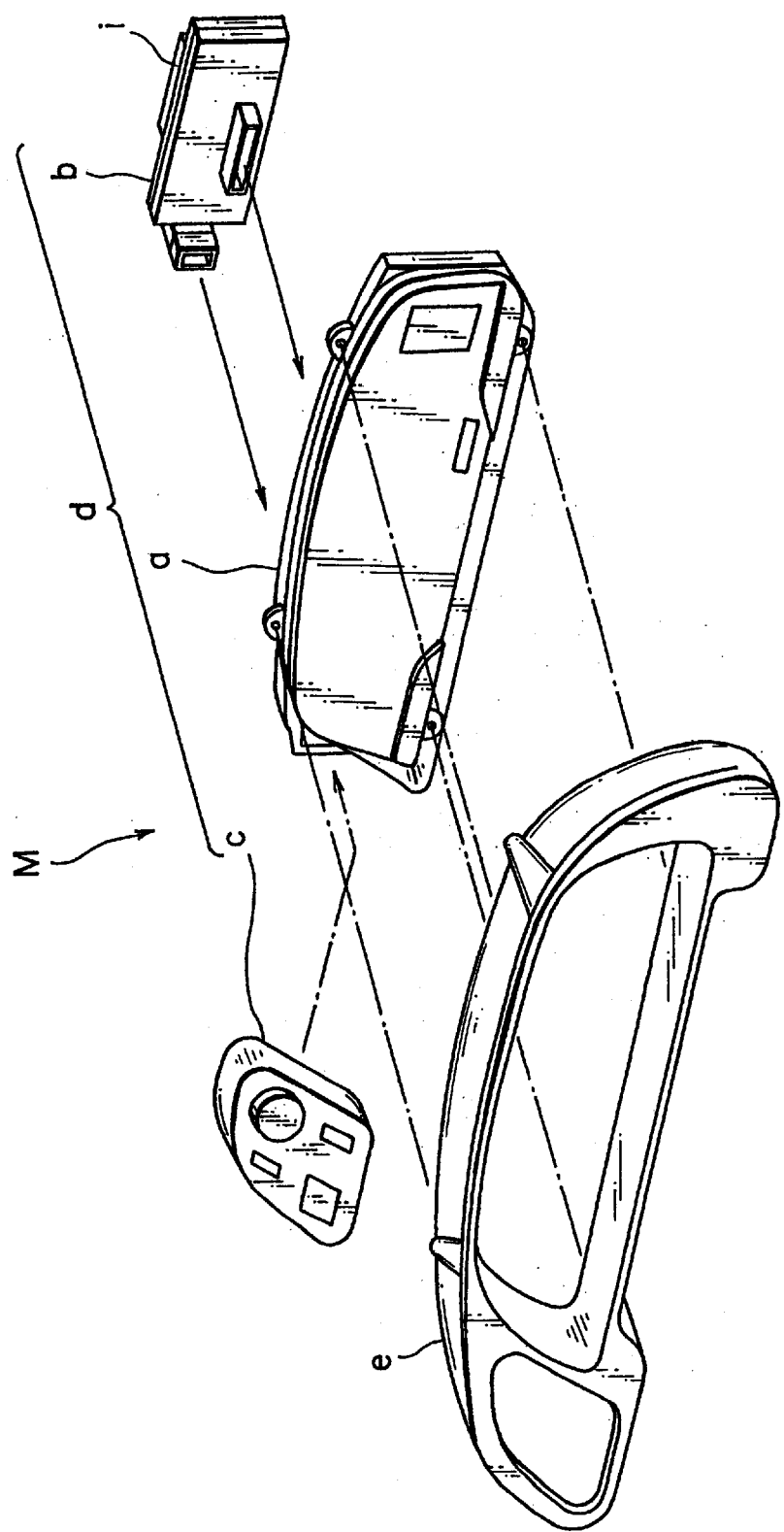
FIG. 7 is an exploded perspective view of a conventional meter module.
Figure 8:
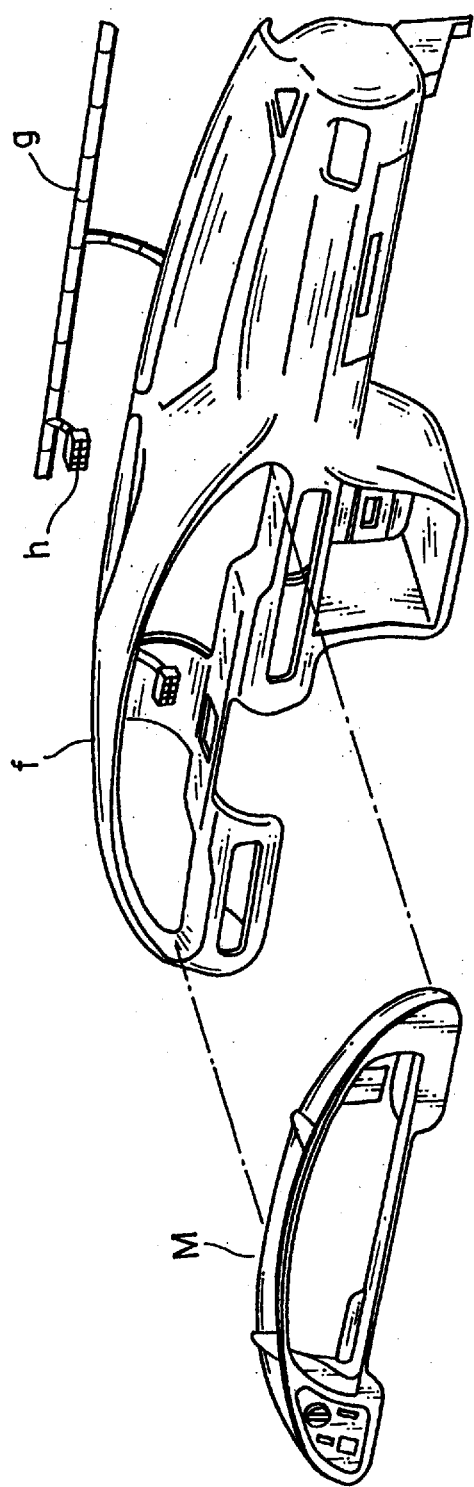
FIG. 8 is a perspective view illustrating a process for installing the meter module of FIG. 7 in an instrument panel.

As seen in FIG. 6, for the electrical connection of the meter module A with the wire harness W provided for the instrument panel P, a connector 26 for a meter module branched from the wire harness W is engaged with a connector (not shown) attached to the terminal of the electric wires 20, which are connected to the connector 19 of the introducing guides 17.

According to the present invention, since the meter module is formed of a separated meter display unit and a separated cluster unit, it is possible to change the structure of the meter display unit or the cluster unit independently to cope with a functional change or a design change associated with a model, type or grade of a motor vehicle, and this flexibility of the meter module allows a manufacturer for producing various types and grades of motor vehicles without increasing production costs. Since the meter display unit is independent, peripheral accessories can easily be mounted around the periphery or on the back side of the meter display unit to perform their functions to the full extent thereof.

Since guide protrusions are formed on the meter display unit and the cluster unit, and introducing guides are formed in the module accommodating portion of an instrument panel of a motor vehicle to receive the guide protrusions, it is easily possible to position the components accurately and to visually confirm a state of connection at respective connecting portions, the efficiency of the installation procedure is considerably improved. Further, since the same introducing guides are used to receive the guide protrusions of both the meter display unit and the cluster unit, the productivity in assembling meter modules is greatly improved.

What is claimed is:

1. An instrument panel assembly of a motor vehicle, comprising:
   a meter module including:
      a meter display unit having a meter and a guide protrusion; and
      a cluster unit, separate from said meter display unit, having an electric circuit for controlling said meter and a switch, and another guide protrusion; and
   a module accommodating portion receiving said separate meter display unit and cluster unit and having an introducing guide engaging said guide protrusions,
   wherein electric contacts, connected to circuit conductors of said meter display unit and said cluster unit, are arranged respectively on said guide protrusions, and
   wherein electric contactors, electrically connected to said electric contacts on said guide protrusions, are arranged on said introducing guide of said module accommodating portion.

2. An instrument panel assembly of a motor vehicle, comprising:
   a meter module including:
      a meter display unit having a meter and provided with a guide protrusion on the top thereof; and
      a cluster unit, separate from said meter display unit, having an electric circuit for controlling said meter and a switch and provided with another guide protrusion on the top thereof; and
   a module accommodating portion receiving said separate meter display unit and said cluster unit and having an introducing guide receiving said guide protrusions,
   wherein electric contacts, connected to circuit conductors of said meter display unit and said cluster unit, are provided respectively on said guide protrusions of said meter display unit and said cluster unit,
   wherein electric contactors, electrically connected to said electric contacts on said guide protrusions, are provided on said introducing guide of said module accommodating portion, and
   wherein said meter display unit and said cluster unit are installed into said module accommodating portion by inserting said guide protrusions into said introducing guide, whereby said electric contacts and contactors are contacted with each other to provide electric connection simultaneously with said insertion of said guide protrusions into said introducing guide.

3. An instrument panel assembly according to claim 1 or 2, wherein said guide protrusions of said meter display unit and said cluster unit are inserted into the same introducing guide of said module accommodating portion.

4. An instrument panel assembly of a motor vehicle, comprising:
   a meter module including:
      a meter display unit having a meter, a guide protrusion, and an electrical contact connected to the meter, the electrical contact being disposed on the guide protrusion; and
      a cluster unit, separate from said meter display unit, having a switch, a guide protrusion, and an electrical contact connected to the switch, the electrical contact being disposed on the guide protrusion; and
   a module accommodating portion receiving said meter module, said module accommodating portion having a connector with guide grooves receiving the guide protrusions of said meter display unit and said cluster unit, said connector having a first electrical contact contacting the electrical contact on the guide protrusion of said meter display unit and a second electrical contact contacting the electrical contact on the guide protrusion of said cluster unit, said first and second electrical contacts of said connector being disposed between said guide grooves.

5. An instrument panel assembly as recited in claim 4, wherein the guide protrusions of said meter display unit and said cluster unit are aligned with each other, one in front of the other, and
   wherein the first and second electrical contacts of the connector of said module accommodating portion are separated from each other in the direction of alignment of the guide protrusions of said meter display unit and said cluster unit.

* * * * *